(12) United States Patent
Pennig et al.

(10) Patent No.: US 10,679,383 B2
(45) Date of Patent: Jun. 9, 2020

(54) INTERFACE COLOR BRANDING

(71) Applicant: salesforce.com, inc., San Francisco, CA (US)

(72) Inventors: Jade Frances Pennig, West St. Paul, MN (US); Yon Aran Rhee, Bainbridge Island, WA (US); Mary Ann Jawilli, El Cerrito, CA (US)

(73) Assignee: salesforce.com, inc., San Francisco, CA (US)

( * ) Notice: Subject to any disclaimer, the term of this patent is extended or adjusted under 35 U.S.C. 154(b) by 148 days.

(21) Appl. No.: 15/803,560

(22) Filed: Nov. 3, 2017

(65) Prior Publication Data

US 2019/0139268 A1     May 9, 2019

(51) Int. Cl.

| | |
|---|---|
| *G06F 3/00* | (2006.01) |
| *G06T 11/00* | (2006.01) |
| *G09G 5/06* | (2006.01) |
| *H04N 1/56* | (2006.01) |
| *G06T 7/90* | (2017.01) |
| *G06F 3/0481* | (2013.01) |
| *H04N 1/62* | (2006.01) |
| *H04N 1/60* | (2006.01) |
| *G09G 5/02* | (2006.01) |
| *G06F 3/01* | (2006.01) |
| *G06F 8/34* | (2018.01) |
| *G06F 8/33* | (2018.01) |

(52) U.S. Cl.
CPC .......... *G06T 11/001* (2013.01); *G06F 3/0481* (2013.01); *G06T 7/90* (2017.01); *G09G 5/026* (2013.01); *G09G 5/06* (2013.01); *H04N 1/56* (2013.01); *H04N 1/6008* (2013.01); *H04N 1/622* (2013.01); *H04N 1/628* (2013.01); *G06F 8/33* (2013.01); *G06F 8/34* (2013.01); *G09G 2320/0666* (2013.01); *G09G 2340/06* (2013.01)

(58) Field of Classification Search
CPC ....... G06T 11/001; G06T 7/90; G06F 3/0481; G06F 8/34
See application file for complete search history.

(56) References Cited

U.S. PATENT DOCUMENTS

| | | | |
|---|---|---|---|
| 6,680,740 B2 * | 1/2004 | Krueger | ................. H04N 1/603 345/601 |
| 8,205,156 B2 * | 6/2012 | Gibson | ..................... G06F 3/14 715/234 |

(Continued)

*Primary Examiner* — Nicholas Augustine
(74) *Attorney, Agent, or Firm* — Sterne, Kessler, Goldstein and Fox P.L.L.C.

(57) ABSTRACT

Disclosed herein are system, method, and computer program product embodiments providing interface color branding. An embodiment operates by receiving a primary color associated with a theme of a user interface. A first color code corresponding to the primary color is determined. The first color code is converted into a second color code corresponding to the primary color, wherein the first color code is in a device-dependent color format and the second color code is in a device-independent color format. A secondary color corresponding to each of one or more portions of the user interface is derived from the second color code. Each secondary color is converted from the device-independent color format into the device-dependent color format. The one or more portions of the user interface are colored in the device-dependent color format.

20 Claims, 5 Drawing Sheets

(56) References Cited

U.S. PATENT DOCUMENTS

| | | | | |
|---|---|---|---|---|
| 8,898,741 B2* | 11/2014 | Goodwin | ............... | G06F 3/0481 |
| | | | | 726/2 |
| 8,930,824 B2* | 1/2015 | Bennett | ................ | G06F 16/958 |
| | | | | 715/745 |
| 9,158,438 B2* | 10/2015 | Roessler | ............. | G06F 3/04847 |
| 9,841,880 B1* | 12/2017 | Beaty | ..................... | G06F 3/0484 |
| 2005/0278625 A1* | 12/2005 | Wessling | ............. | G06F 40/186 |
| | | | | 715/273 |
| 2010/0118200 A1* | 5/2010 | Gelman | .................. | G06F 3/041 |
| | | | | 348/578 |
| 2013/0055116 A1* | 2/2013 | Kern | ..................... | G06F 16/958 |
| | | | | 715/762 |
| 2015/0363380 A1* | 12/2015 | McNaught | ............ | G06F 40/186 |
| | | | | 715/235 |
| 2017/0153803 A1* | 6/2017 | Raghavan | ........... | G06F 16/2329 |
| 2017/0169585 A1* | 6/2017 | Chen | ..................... | G06F 3/04817 |
| 2018/0040144 A1* | 2/2018 | Li | ........................ | G06T 11/001 |
| 2019/0025900 A1* | 1/2019 | Azam | .................. | G06F 1/3218 |

\* cited by examiner

INTERFACE COLOR BRANDING

BACKGROUND

Designing a user interface often includes not only deciding which components are visible on the interface, but also determining how those components are visually rendered in terms of size, positioning, and color. This design process is often done manually, is time-consuming, and is performed on an interface-by-interface basis. In selecting the colors for an interface, a designer will often manually select which color(s) to use for which areas of an interface. But for each color selection, the designer often has to manually determine how the color impacts the readability of the interface, particularly in regard to other colors. Then, if one of the colors is changed, all of the colors may need to be changed or re-evaluated, requiring additional time and processing.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for interface color branding.

Figure 1:
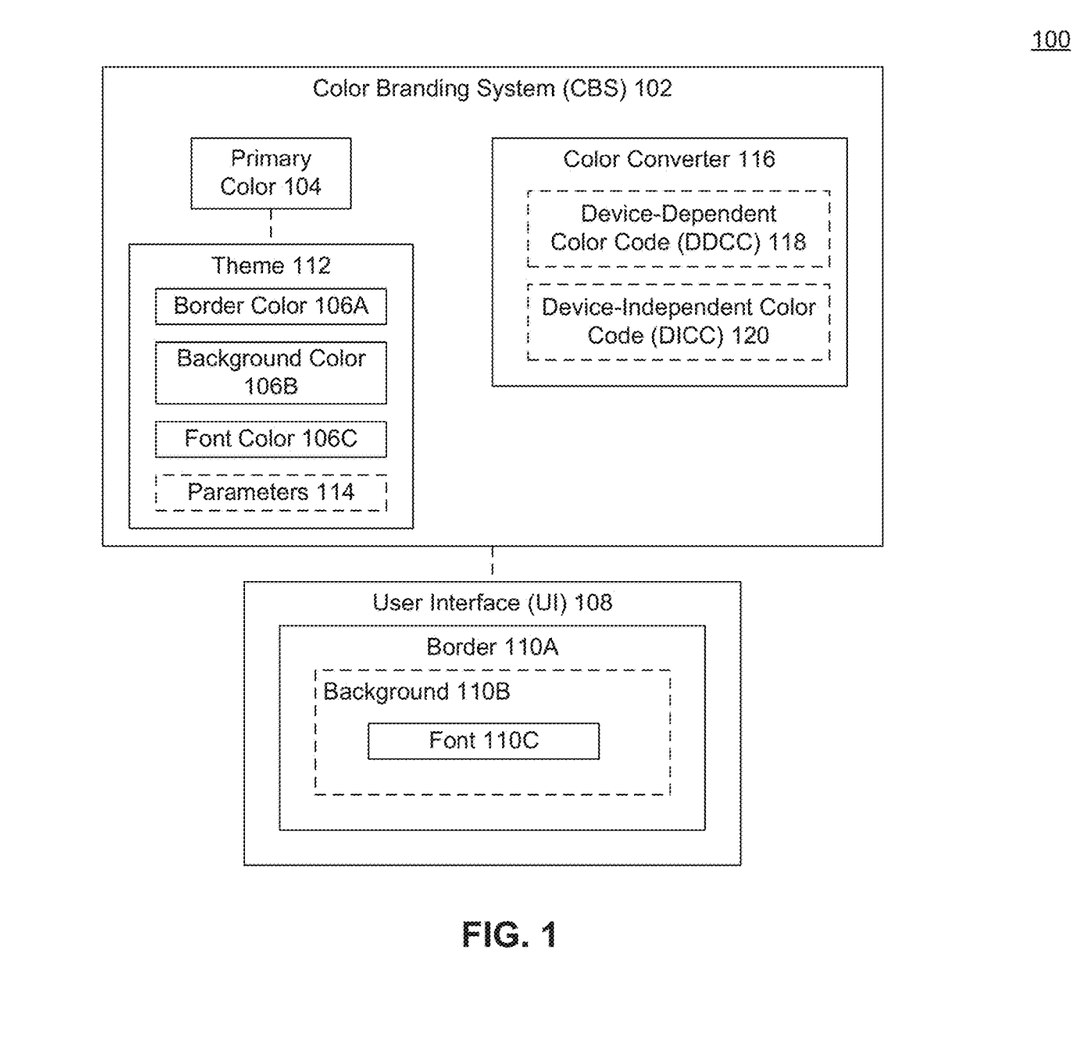
FIG. 1 is a block diagram showing example operations related to providing interface color branding, according to some embodiments.

FIG. 1 is a block diagram 100 showing example operations related to interface color branding, according to some embodiments. A color branding system (CBS) 102 may automatically derive different colors 106 to be used on different portions 110 of an interface 108 from a primary color 104. CBS 102 enables users to quickly and simply adjust the appearance of webpages and other user interfaces (UI) 108 by generating a color palette for use with the interface 108 based on the selection of one or more primary colors 104.

For example, an interface can include different sections or visual components that are to be colored differently, such as menu items, buttons, borders, and background. Rather than having a designer select different colors for each section, which would be a time consuming and resource intensive process requiring the designer to manually select evaluate each color selection against every other color selection for an interface to try and determine how readability of the interface is impacted, CBS 102 enables a user to provide one or more primary colors 104. CBS 102 may then automatically generate a color palette, including one or more secondary colors 106, in accordance with a theme 112 of the UI 108. CBS 102 saves both the time and processing resources that would be involved in the manual selection of colors for an interface.

Primary color 104 may include one or more colors that are used as a base color or main color scheme for a particular UI 108. For example, primary color 104 may be a brand color, such as a color that is associated with a company's logo, mascot, or product(s). In an embodiment, a customer or user may upload an image and select a particular portion or color from the image to designate as the primary color 104. Or, for example, CBS 102 may provide a color selector (as described in greater detail below in FIG. 2A) from which the user may select one or more primary colors 104 to be used with UI 108.

In an embodiment, primary color 104 may include any selected color that is designed as part of the theme 112 of a color palette or for different portions 110 of UI 108. For example, primary color 104 may include a both a brand color 104 for theme 112 and a selected background color 106B. In an embodiment, any color selections (by a user or administrator) may be designated as primary colors 104. In an embodiment, primary colors 104 are not changed or altered by CBS 102.

Based on whatever primary color 104 selections are received, CBS 102 may automatically generate one or more secondary colors 106, in accordance with theme 112, for the remaining portions 110 of interface for which primary colors 104 were not specifically selected. In an embodiment, primary colors 104 may be any user selected, non-automatically derived colors that are associated with coloring different portions 110 of UI 108.

Theme 112 may define relationships between primary color 104 and one or more secondary colors 106. Secondary colors 106 may include any colors not specifically selected by a user, or colors that are otherwise derived from primary color 104 in accordance with theme 112. In an embodiment, theme 112 may include a general design idea or aesthetic regarding how the different colors 106, 104 are relate to one another and/or are to be used for coloring different portions 110 of interface 108. Theme 112 may be a general description of relationships or colors. Example themes 112 may include light, dark, holiday, corporate, personal, services, products, sports, daytime, nighttime, etc.

Theme 112 may include different parameters 114 that may be used to derive secondary colors 106 from primary color 104. Parameters 114 may include algorithms, formulas, recipes, or mathematical transformations on how to derive secondary colors 106 from a specified primary color 104 in accordance with theme 112. In an embodiment, parameters 114 may indicate changes to the hue, saturation, contrast, shading, lightness, Chroma, or brightness of primary color 104 to generate different secondary colors 106. Or, for example, parameter 114 may indicate that primary color 104 is to be blended with one or more other colors to generate a secondary color 106. The blended colors may be previously associated with theme 112 or provided via a user selection.

A particular theme 112 may include a set of related parameters 114 indicating how to derive different secondary colors 106. Parameters may indicate changes to be made from primary color 104 to derive a secondary color 106, or changes to be made from first secondary color 106 to generate a second secondary color 106. For example, a parameter 114 may indicate what changes or transformations are to be made to primary color 104 to derive background color 106B, and a second parameter 114 may indicate what changes are to be made to background color 106B to derive border color 106A.

In an embodiment, a parameter 114 may indicate a secondary color 106 is selected or derived based on a particular feature of primary color 104. For example, parameter 114 may indicate that background color 106B is either black or white depending on how 'light' or 'dark' primary color 104 is determined to be. The parameter 114 may indicate that if primary color 104 is 'dark' then background color is white, and if primary color 104 is light, then background color 106B may be black.

CBS 102 may then evaluate primary color 104 to determine whether it is a light or dark color, and then choose the corresponding background color 106B. In an embodiment, parameter 114 may indicate a brightness feature threshold to determine whether primary color 104 is 'dark' or 'light.' Then, for example, another parameter 114 of theme 112 may indicate that if background 106B is white, then font color 106C is dark or black, and if background color 106B is black, then font color 106C is white or light.

The secondary colors 106 derived by CBS 102 may correspond to different (colored) portions of interface 108. For example, border color 106A may be the color for the border section 110A, background color 106B may be the color for the background section 110B, and font color 106C may be the color for fonts 110C being used in the interface 108 (or a portion thereof).

The secondary colors 106 and corresponding interface portions 110 provided herein are exemplary, and not limiting. It is understood that in different embodiments, UI 108 may include different portions 110, and that multiple portions may include or correspond to the same secondary color 106 or primary color 104. For example, there may be a portion 110 of interface 108 for which primary color 104 is used instead of a secondary color 106.

Theme 112 may incorporate the relationships between where the different portions 110 are displayed, to determine parameters 114 for the corresponding secondary colors 106. CBS 102 may enable multiple different UIs 108 (for different applications or clients) to be configured quickly and with less processing resources relative to a designer manually selecting each different color to be used. Themes 112 may enable visual uniformity (e.g., with regard to shading, contrast, brightness, readability, etc.) across different UIs 108 with different primary colors 104. For example, the same theme 112 may be applied to two different UIs with two different primary colors 104. Then, for example, the variances (as defined by parameter 114) between the relative primary colors 104 and the relative background colors 106B may be uniform regardless of which primary color 104 is actually selected. Then, for example, updates to a particular parameter 114 could be easily applied to all UIs 108 using the selected theme 112.

In an embodiment, multiple primary colors 104 that may be designated, and the secondary colors 106 may be derived from the multiple primary colors 104 using parameters 114. For example, primary color 104 may include a 'light' primary color and a 'dark' primary color, either or both of which may be used by CBS 102 to derive secondary colors 106.

In an embodiment, a color converter 116 may convert colors back and forth between a device-dependent color code (DDCC) 118 and a device-independent color code (DICC) 120. DDCC 118 may be a color format that is used to render colors on a specific user device (e.g., laptop, mobile phone, monitor) or via a specific application or platform (operating system, browser, webpage, etc.).

In an embodiment, DDCC 118 may correspond to the RGB (red-green-blue) color model. In the RGB color model, red, green, and blue or added or blended together in various ways to produce an array of colors. RGB may be used to display images, text, and multimedia in electronic devices and systems. In an embodiment, RGB may be device-dependent, in that different devices reproduce a given RGB value or color code differently. For example, the color elements of individual R. G. B levels may vary across different manufacturers of electronic devices, or may vary in a device over time. In an embodiment, a DDCC 118 color code or format may include a web color used in displaying a web page or document (e.g., in a browser). An example web color may include a HTML (hypertext markup language), XML (extensible markup language). CSS (cascading style sheets), or hexadecimal value used to designate which color is to appear on a webpage. For example, the color code or DDCC 118 may include a hexadecimal value of "#7ED321" which may correspond to a particular shade of green.

In an embodiment, DICC 120 may correspond to the Lab color space. Unlike RGB, Lab may describe or account for a broader range of colors beyond those reproducible based on a particular device's capabilities or manufacturer's specifications (e.g., beyond those available in RGB). In an embodiment. Lab may mathematically describe colors in three dimensions: lightness, A (green-red), and B (blue-yellow) with various values. In an embodiment, DICC 120 may be a perceptually uniform color space. For example, the perceptual uniformity of DICC 120 may enable uniformity of relationships between color contrast and visibility.

Though the specification primarily describes the use of RGB DDCC 118 and Lab for DICC 120, respectively, these are example embodiments only. It is understood that in other embodiments, other color spaces may be used. For example, DDCC 118 may include sRGB (standard RGB) or other implementations of RGB. Or, for example, DICC 120 may include color spaces as adopted by the International Commission on Illumination (CIE), such as CIELUV or CIECAM02.

In an embodiment, CBS 102 may receive a selection of primary color 104 from a webpage, device, application, or other program as a DDCC 118. Color converter 116 may then convert DDCC 118 from primary color 104 into a corresponding DICC 120 for primary color 104. Then, for example, using DICC 120 for primary color 104, CBS 102 may generate secondary colors 106 in DICC 120 by applying transformations indicated by parameters 114.

Color converter 116 may then convert the derived or generated DICC 120 values for secondary colors 106 into corresponding DDCC 118 colors for display of UI 108 on one or more devices. Converting from DDCC 118 and using DICC 120 to generate secondary colors 106 both enables CBS 102 to select from an use a broader array of colors than would otherwise be available in DDCC 118 alone and enables CBS 102 to perform mathematical transformations or algorithms to generate new pre-defined color variances from primary color 104 (as defined by parameters 114).

Figure 2A:
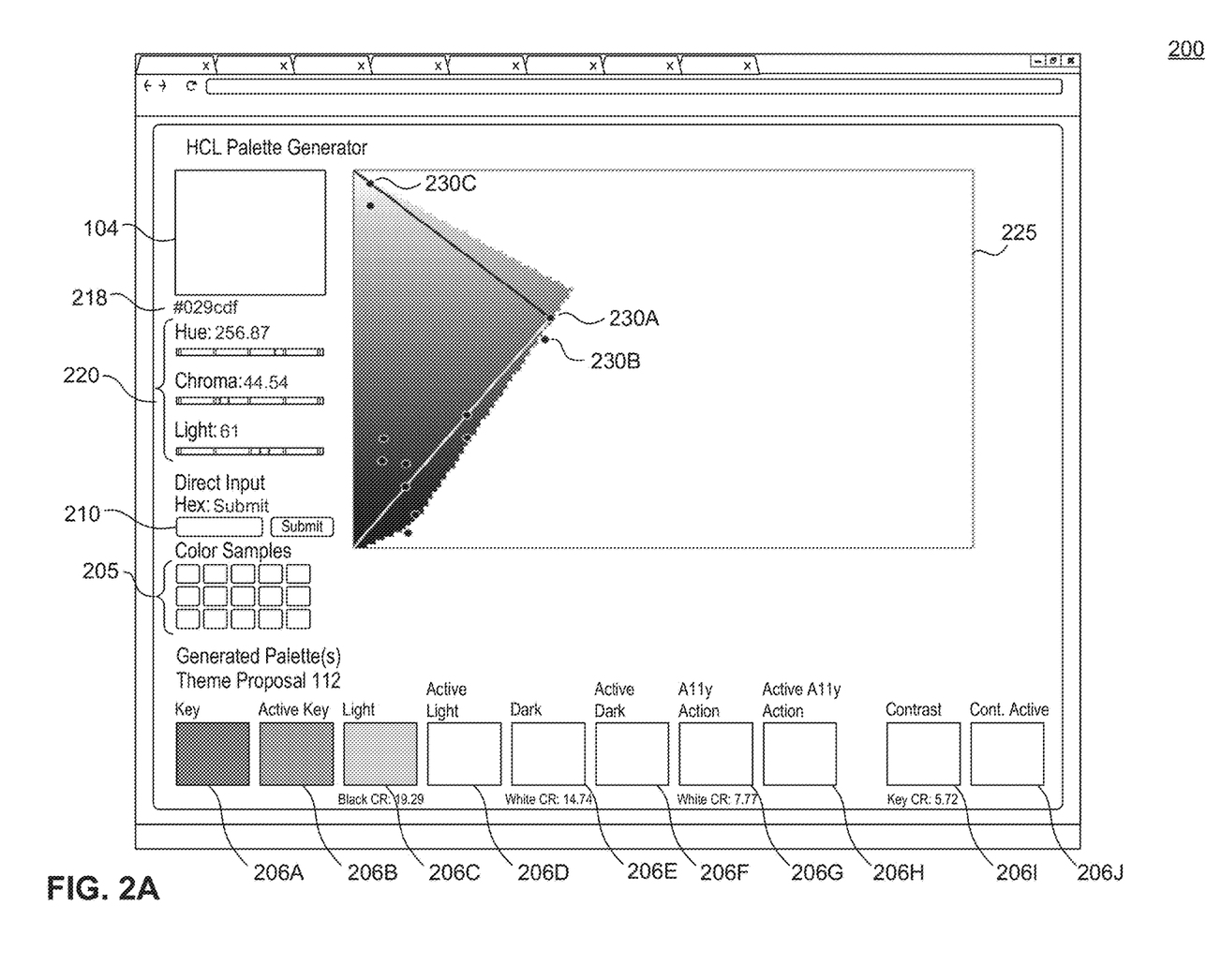
FIG. 2A illustrates an example color picker interface related to providing interface color branding, according to some embodiments.

FIG. 2A illustrates an example color picker interface 200 related to providing interface color branding, according to some embodiments. Interface 200 may include a color sample area 205 from which a user may select colors for primary color 104. For example, a user may select any of the provided or pre-selected colors to use as primary color 104. Section 210 indicates an area where CBS 102 may receive a Hex value corresponding to a color. Hex value may correspond to a color to be displayed on a webpage in a hexadecimal, or RGB triplet format (corresponding to DDCC 118). 218 illustrates a hex color value corresponding to a color selected from color samples 205.

220 illustrates a color code in DICC 120 corresponding to the selected DDCC 218 value. In the example shown, color code 220 may correspond to Lab values accounting for lightness, hue, and Chroma. In other embodiments, color spaces other than RGB and Lab may be used, these are provided as exemplary embodiments. CBS 102 may generate the color palette for an interface in accordance with theme 112 as shown in secondary colors 206A-206J. The secondary colors 206 may be derived from primary color 104, and are exemplary.

In an embodiment, CBS 102 may provide a preview area 225 which includes different indicators 230 corresponding to the various secondary colors 206. In the example shown, the markers 230A, 230B, and 230C may correspond to the secondary colors 206A, 206B, and 206C, respectively. The color picker interface 200 may enable a user to preview and adjust the various secondary colors (color palette) to be used on a UI 208. In an embodiment, a user many manually change or adjust any of secondary colors 206 or primary color 104. If an adjustment or color change in made, CBS 102 may then reconfigure the remaining colors 206 based on the corresponding parameters 114 of theme 112.

In an embodiment, CBS 102 may derive a full set of secondary colors 206 from each primary color 104 selected (if multiple primary colors 104 are selected). Then, for example, an administrator or other user may be provided the option to select which color palette or combination of secondary colors 206 from across the primary colors 104 to use for a UI 108.

In another embodiment, CBS 102 may enable previews across different themes 112. Each theme 112 may include its own unique set of secondary colors 206 that are generated based on the theme's individual parameters 114. For example, interface 200 may enable a user to see the color palette in a different theme 112, using the same selected primary color 104.

Figure 2B:
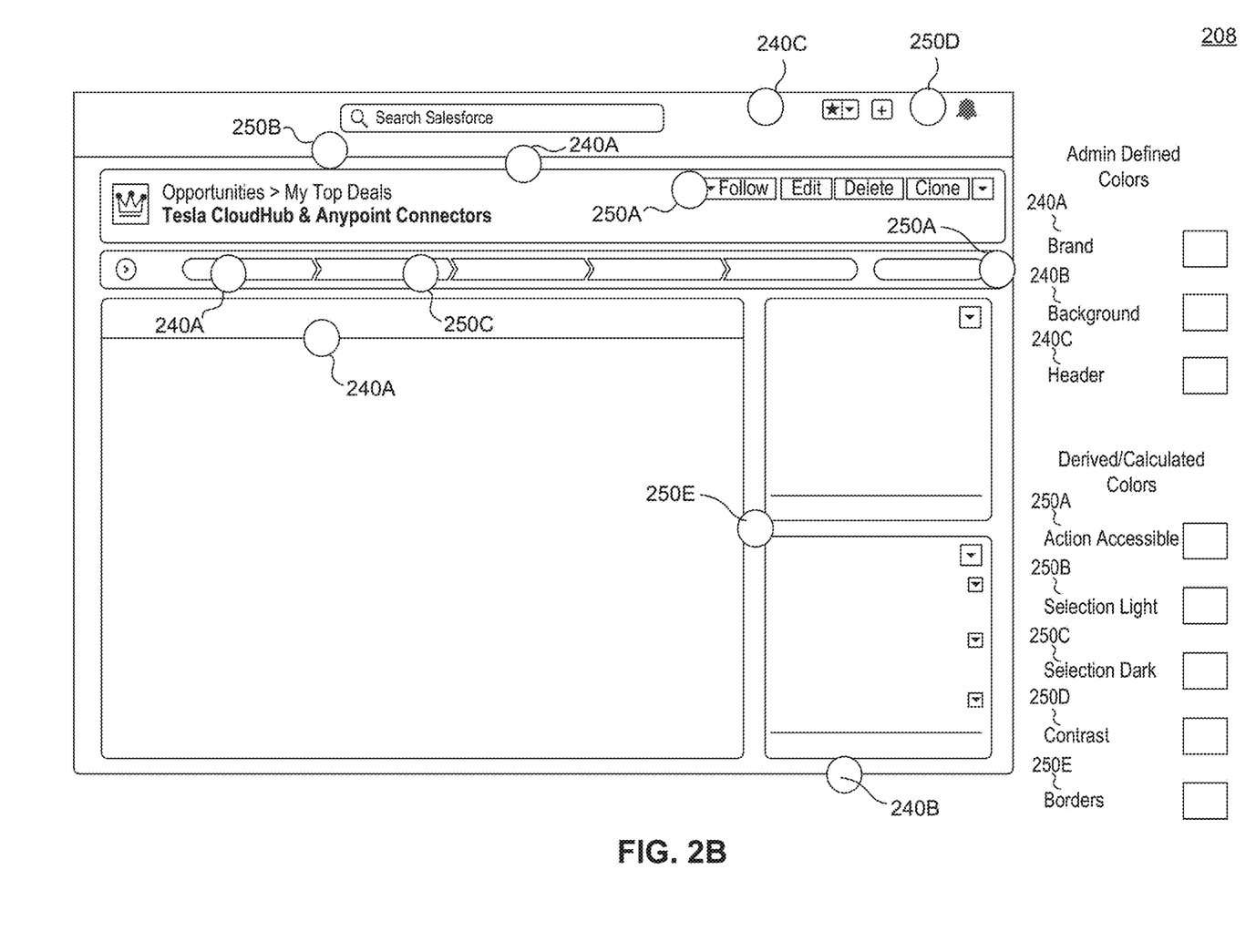
FIG. 2B illustrates an example of different portions of an interface that may be colored, according to an example embodiment.

FIG. 2B illustrates an example of different portions of an interface 208 that may be colored, according to an example embodiment. In the example shown, three primary colors 240A-C may be selected by an administrator or user. Based on the selected colors 240A-C, CBS 102 may generate derived or calculated secondary colors 250A-E. In the example shown, the various colors 240, 250 may correspond to different (similarly numbered) indicated portions of a particular interface 208.

In an embodiment, one or more of the derived colors 250 may be derived or generated from one or more of the administrator selected colors 240. For example, borders 250E may be derived from background 240B. Selection light 240C and selection dark 240D may be derived from header 240C, and contrast 250D may be derived from brand 240A. In other themes 112 or embodiments, the derived colors 250 may be derived from different combinations of primary or admin defined colors 240.

Figure 3:
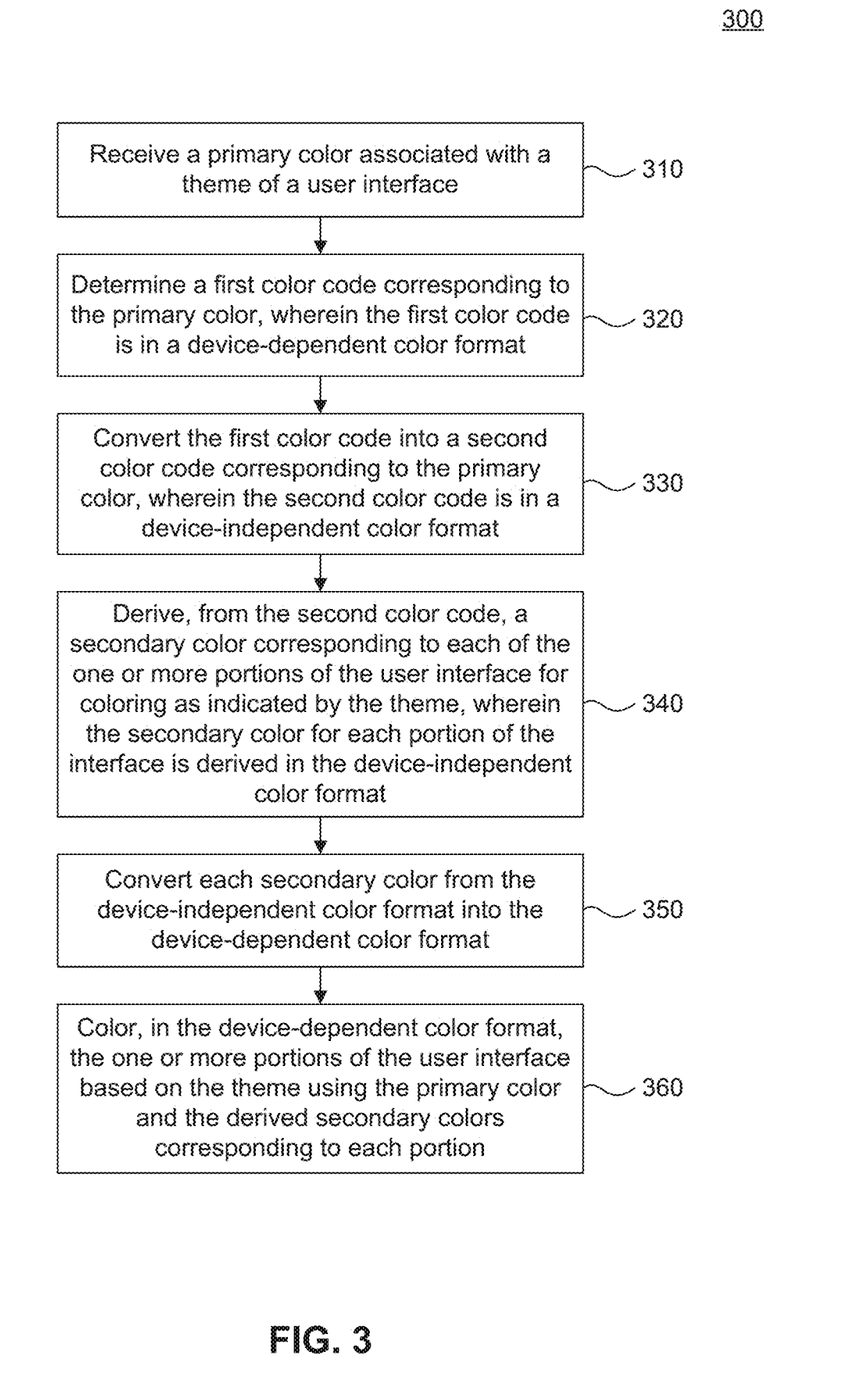
FIG. 3 is a flowchart illustrating a process for providing interface color branding, according to some embodiments.

FIG. 3 is a flowchart illustrating a process 300 for providing interface color branding, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

At 310, a primary color associated with a theme of a user interface is received. For example, as shown in FIG. 2A, CBS 102 may receive a color selection 205 or hex value 210 indicating a primary color 104 for a theme 112 of a UI 108. As shown in FIG. 1, theme 112 may include various derived or secondary colors 106A-C corresponding to different identified portions 110A-C, respectively, of UI 108.

At 320, a first color code is converted into a second color code corresponding to the primary color, wherein the second color code is in a device-independent color format. For example, as shown in FIG. 2A, a first color code 218 may be converted into a second color code 220 for the primary color 104. In an embodiment, first color code 218 may correspond to selection from sample colors 205 and be RGB or hexadecimal value formatted. The format of color code 218 may enable a device or display or render the color. In an embodiment, different devices may render the actual color differently depending on the particular device's capabilities.

The second color code 220 may be in Lab value or Lab formatted. In an embodiment, Lab may include a larger or broader spectrum of colors that are represented by mathematical equations. Converting the RGB color code 218 into the Lab color code 220, may enable CBS 102 to perform mathematical transformations on the Lab color code 220 value to generate secondary colors 106 that are better matched to primary color 104 based on theme 112.

At 330, a secondary color corresponding to each of the one or more portions of the user interface for coloring as indicated by the theme is derived from the second color code, wherein the secondary color for each portion of the interface is derived in the device-independent color format. For example, as shown in FIG. 1, CBS 102 may generate secondary colors for border color 106A, background color 106B, and font color 16C in DICC 122. CBS 102 may apply one or more parameters 114 to the generated DICC 120 for primary color 104 to generate DICCs 120 for each secondary color 106.

At 340, each secondary color is converted from the device-independent color format into the device-dependent color format. For example, as shown in FIG. 1, color converter 116 may convert or transform the DICC 120 color values for secondary colors 106 into corresponding DDCC 118 color values for rendering by a device or on a UI 108. In an embodiment, there may not be a DDCC color value 118 that exactly matches the DICC color value 120. Then, for example, color converter 116 may select from available DDCC color value 118 that most closely represents the DICC color value 120.

At 350, the one or more portions of the user interface are colored, in the device-dependent color format, based on the theme using the primary color and the derived secondary colors corresponding to each portion. For example, as shown in FIG. 2B, UI 208 may be a webpage or program interface. CBS 102 may modify the HTML or hexadecimal color code (replacing default colors or placeholders) used to generate the corresponding portions of UI 208 to reflect the selected and derived colors 240, 250. Or, for example, CBS 102 may provide the values in a separate file that may be referenced or used by a browser or other application when rendering UI 108.

Figure 4:
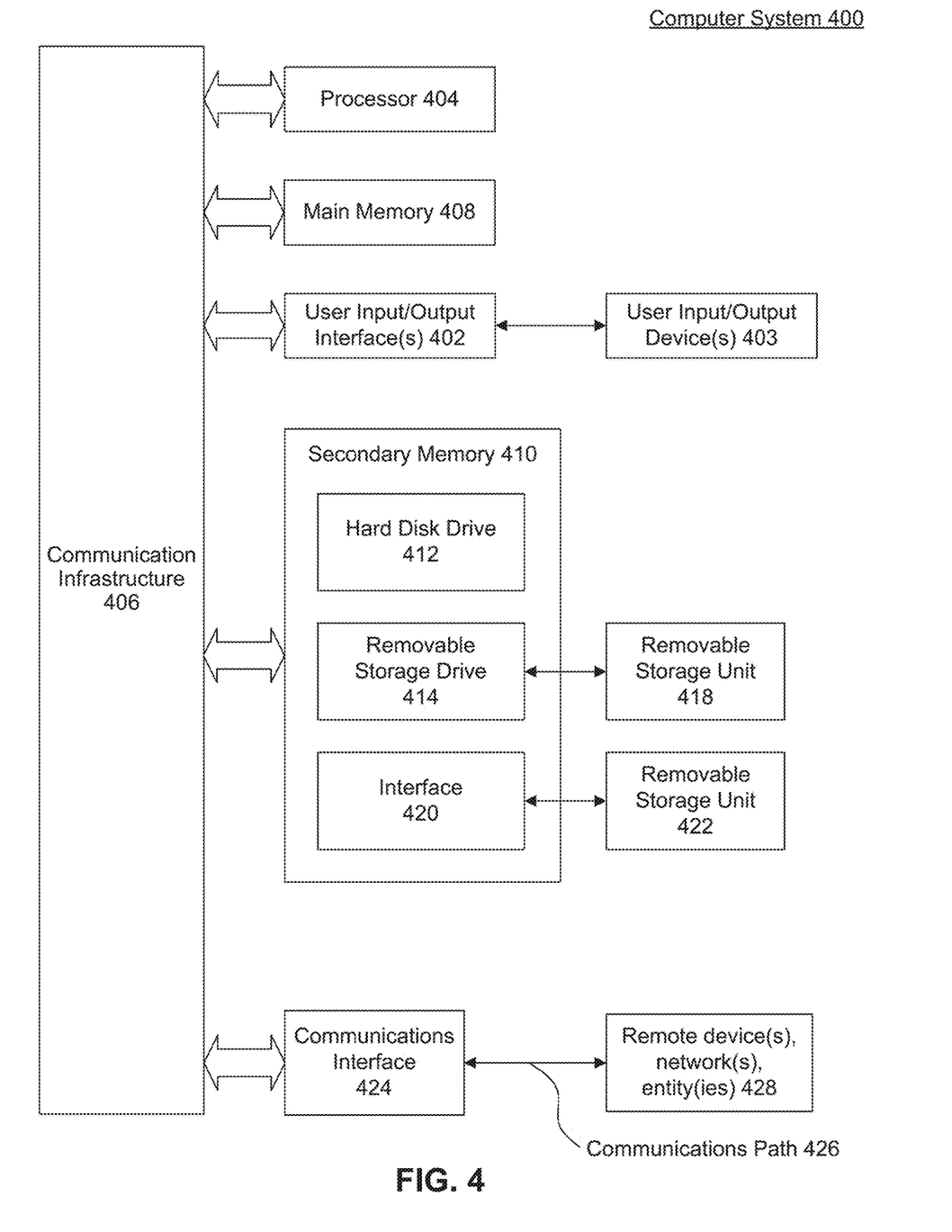
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions): "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
    receiving, from a color picker interface displayed on a computing device, a primary color associated with a theme of a user interface, wherein the theme indicates one or more portions of the user interface for coloring based on the primary color with one or more secondary colors;
    determining, from the color picker interface, a first color code corresponding to the primary color, wherein the first color code is in a device-dependent color format;
    converting the first color code from the device-dependent color format into a second color code of a device-independent color format corresponding to the primary color;
    deriving, from the second color code, a secondary color corresponding to each of the one or more portions of the user interface for coloring as indicated by the theme, wherein the secondary color for each portion of the interface is derived in the device-independent color format;
    converting each secondary color from the device-independent color format into the device-dependent color format;
    causing a display in the color picker interface of: the first color code, the second color code, and the one or more portions of the user interface with their corresponding secondary colors, wherein the secondary colors are configurable from the color picker interface; and
    coloring, upon receiving approval of the secondary colors displayed in the color picker interface, in the device-dependent color format, the one or more portions of the user interface based on the theme using the primary color and the derived secondary colors in the device-dependent color format corresponding to each portion.

2. The method of claim 1, wherein the determining comprises:
    determining a hypertext markup language (HMTL) color code corresponding to the primary color.

3. The method of claim 2, wherein the device-independent color format corresponds to a lightness, green-red, and blue-yellow (Lab) color model, and wherein the device-dependent color format corresponds to a red-green-blue (RGB) color model.

4. The method of claim 1, wherein the receiving comprises:
    receiving a brand color, a background color, and a header color.

5. The method of claim 4, wherein the deriving comprises:
    select a first derived secondary color based on the brand color; and
    select a second derived secondary color based on one of the background color or the header color.

6. The method of claim 1, wherein the coloring comprises:
    determining HTML color codes corresponding to each of the secondary colors; and
    updating a placeholder in an HTML document with each of the determined HTML color codes.

7. The method of claim 1, wherein the deriving comprises:
    performing a mathematical transformation on the second color code to generate the second colors corresponding to each of the one or more portions of the user interface.

8. A system, comprising:
    a memory; and
    at least one processor coupled to the memory and configured to:
    receive, from a color picker interface displayed on a computing device, a primary color associated with a theme of a user interface, wherein the theme indicates one or more portions of the user interface for coloring based on the primary color with one or more secondary colors;
    determine, from the color picker interface, a first color code corresponding to the primary color, wherein the first color code is in a device-dependent color format;
    convert the first color code from the device-dependent color format into a second color code of a device-independent color format corresponding to the primary color;
    derive, from the second color code, a secondary color corresponding to each of the one or more portions of the user interface for coloring as indicated by the theme, wherein the secondary color for each portion of the interface is derived in the device-independent color format;
    convert each secondary color from the device-independent color format into the device-dependent color format;
    cause a display in the color picker interface of: the first color code, the second color code, and the one or more portions of the user interface with their corresponding secondary colors, wherein the secondary colors are configurable from the color picker interface; and
    color, upon receiving approval of the secondary colors displayed in the color picker interface, in the device-dependent color format, the one or more portions of the user interface based on the theme using the primary color and the derived secondary colors in the device-dependent color format corresponding to each portion.

9. The system of claim 8, wherein the at least one processor is configured to:
determine a hypertext markup language (HMTL) color code corresponding to the primary color.

10. The system of claim 9, wherein the device-independent color format corresponds to a lightness, green-red, and blue-yellow (Lab) color model, and wherein the device-dependent color format corresponds to a red-green-blue (RGB) color model.

11. The system of claim 8, wherein the processor is that receives is further configured to:
receive a brand color, a background color, and a header color.

12. The system of claim 11, wherein the processor that derives is configured to:
select a first derived secondary color based on the brand color; and
select a second derived secondary color based on one of the background color or the header color.

13. The system of claim 8, wherein the processor that colors is configured to:
determine HTML color codes corresponding to each of the secondary colors; and
update a placeholder in an HTML document with each of the determined HTML color codes.

14. The system of claim 8, wherein the processor that derives is configured to:
performing a mathematical transformation on the second color code to generate the second colors corresponding to each of the one or more portions of the user interface.

15. The system of claim 10, wherein the interaction comprises a read access to data on a particular date and time, and wherein the new tab includes a shortcut to a snapshot of the data on the particular date and time.

16. A non-transitory computer-readable device having instructions stored on a memory thereon that when executed by at least one processor of the device, causes the at least one processor to perform operations comprising:
receiving, from a color picker interface displayed on a computing device, a primary color associated with a theme of a user interface, wherein the theme indicates one or more portions of the user interface for coloring based on the primary color with one or more secondary colors;

determining, from the color picker interface, a first color code corresponding to the primary color, wherein the first color code is in a device-dependent color format;
converting the first color code from the device-dependent color format into a second color code of a device-independent color format corresponding to the primary color;
deriving, from the second color code, a secondary color corresponding to each of the one or more portions of the user interface for coloring as indicated by the theme, wherein the secondary color for each portion of the interface is derived in the device-independent color format;
converting each secondary color from the device-independent color format into the device-dependent color format; and
causing a display in the color picker interface of: the first color code, the second color code, and the one or more portions of the user interface with their corresponding secondary colors, wherein the secondary colors are configurable from the color picker interface; and
coloring, upon receiving approval of the secondary colors displayed in the color picker interface, in the device-dependent color format, the one or more portions of the user interface based on the theme using the primary color and the derived secondary colors in the device-dependent color format corresponding to each portion.

17. The device of claim 16, wherein a hypertext markup language (HMTL) color code corresponds to the primary color, wherein the device-independent color format corresponds to a lightness, green-red, and blue-yellow (Lab) color model, and wherein the device-dependent color format corresponds to a red-green-blue (RGB) color model.

18. The device of claim 16, wherein the receiving comprises:
receiving a brand color, a background color, and a header color.

19. The method of claim 3, wherein the device-independent color format includes access to more colors than the device-dependent color format.

20. The method of claim 1, further comprising:
receiving a modification of one of the first color code or one of the secondary colors from the color picker interface; and
communicating an update of at least one of the displayed second colors in the color picker interface based on the modification.

* * * * *